(12) United States Patent
Tjensvoll

(10) Patent No.: US 9,181,928 B2
(45) Date of Patent: Nov. 10, 2015

(54) DRIVE DEVICE FOR A WIND TURBINE

(75) Inventor: Gaute Tjensvoll, Oslo (NO)

(73) Assignee: Vestas Wind System A/S, Aarhus N (DK)

( * ) Notice: Subject to any disclaimer, the term of this patent is extended or adjusted under 35 U.S.C. 154(b) by 249 days.

(21) Appl. No.: 13/146,330

(22) PCT Filed: Jan. 28, 2010

(86) PCT No.: PCT/EP2010/050987
§ 371 (c)(1),
(2), (4) Date: Jul. 26, 2011

(87) PCT Pub. No.: WO2010/086362
PCT Pub. Date: Aug. 5, 2010

(65) Prior Publication Data
US 2011/0281677 A1    Nov. 17, 2011

(30) Foreign Application Priority Data

Jan. 28, 2009   (NO) .................................... 20090433

(51) Int. Cl.
  F16H 7/00    (2006.01)
  F03D 11/02   (2006.01)
  F16H 7/02    (2006.01)
(52) U.S. Cl.
  CPC .......... *F03D 11/02* (2013.01); *F05B 2260/4021* (2013.01); *F16H 7/02* (2013.01); *Y02E 10/722* (2013.01); *Y02E 10/726* (2013.01)
(58) Field of Classification Search
  CPC ... Y02E 10/722; Y02E 10/721; Y02E 10/723; Y02E 10/726; F03D 11/0008
  USPC ...................... 474/148, 56, 57, 84, 86, 87, 88
  See application file for complete search history.

(56) References Cited

U.S. PATENT DOCUMENTS

| | | | |
|---|---|---|---|
| 169,380 A | 11/1875 | Smith |
| 204,969 A | 6/1878 | Hall |
| 847,440 A | 3/1907 | Rivett |
| 1,355,672 A | 10/1920 | Howden |
| 1,957,614 A | 5/1934 | Rice |
| 2,058,500 A | 10/1936 | Plucker |
| 2,145,511 A | 1/1939 | Grohmann |

(Continued)

FOREIGN PATENT DOCUMENTS

| | | |
|---|---|---|
| CH | 308352 A | 7/1955 |
| EP | 2060783 A1 | 5/2009 |

(Continued)

OTHER PUBLICATIONS

Van Prooijen, Tom, "International Search Report" prepared for PCT/EP2010/050987 as mailed Jan. 12, 2011, 4 pages.

*Primary Examiner* — Henry Liu
(74) *Attorney, Agent, or Firm* — Winstead PC

(57) ABSTRACT

Drive device for a wind mill comprising a large pulley (21) disposed on a main shaft (22) and at least one belt (27) or chain adapted to transfer rotation from the pulley (21) to a generator (30, 31). The pulley (21) is rotationally coupled to at least two secondary shafts (23, 24), which are disposed parallel to the main shaft (22). One or more belts (27), which transfer the rotation, extend over the pulley (21) and the secondary shafts (23, 24). The secondary shafts (23, 24) are in turn rotationally coupled to at least one, preferably two, electric generators (30, 31).

20 Claims, 7 Drawing Sheets

(56) References Cited

U.S. PATENT DOCUMENTS

| | | | |
|---|---|---|---|
| 2,310,081 A * | 2/1943 | Hill | 474/15 |
| 2,498,611 A | 2/1950 | Staver | |
| 2,508,756 A | 5/1950 | Jackoboice | |
| 2,755,766 A | 7/1956 | Wanzer | |
| 2,910,891 A | 11/1959 | Heckethorn | |
| 2,917,935 A | 12/1959 | Haug | |
| 3,217,552 A | 11/1965 | Daub | |
| 3,477,536 A | 11/1969 | Carini | |
| 3,623,378 A | 11/1971 | Stanford | |
| 3,738,614 A | 6/1973 | Peterson | |
| 3,814,047 A | 6/1974 | Carpenter | |
| 3,911,287 A | 10/1975 | Neville | |
| 3,922,997 A | 12/1975 | Jameson | |
| 3,951,096 A | 4/1976 | Dunlap | |
| 4,006,925 A | 2/1977 | Scherer | |
| 4,088,306 A | 5/1978 | Falkner | |
| 4,162,059 A | 7/1979 | Fletchall | |
| 4,249,085 A | 2/1981 | Kertzman | |
| 4,272,686 A | 6/1981 | Suzuki | |
| 4,282,443 A | 8/1981 | Seidl | |
| 4,293,295 A | 10/1981 | van Deuren | |
| 4,565,352 A | 1/1986 | Hasselmann et al. | |
| 4,585,950 A | 4/1986 | Lund | |
| 4,678,923 A | 7/1987 | Trepanier | |
| 4,773,824 A | 9/1988 | Kiss | |
| 4,787,259 A | 11/1988 | Carson | |
| 4,796,862 A | 1/1989 | Peppel | |
| 4,925,413 A | 5/1990 | Newman et al. | |
| 5,051,059 A | 9/1991 | Rademacher | |
| 5,254,876 A | 10/1993 | Hickey | |
| 5,798,572 A | 8/1998 | Lehoczky | |
| 5,816,968 A | 10/1998 | Watson | |
| 6,104,097 A | 8/2000 | Lehoczky | |
| 6,118,194 A * | 9/2000 | Kawamura | 310/75 R |
| 6,193,218 B1 | 2/2001 | Philyaw | |
| 6,239,524 B1 * | 5/2001 | Leibowitz | 310/112 |
| 6,327,957 B1 | 12/2001 | Carter, Sr. | |
| 6,551,053 B1 | 4/2003 | Schuetz | |
| 6,707,190 B2 | 3/2004 | Leibowitz | |
| 6,872,049 B2 | 3/2005 | Christensen | |
| RE38,887 E * | 11/2005 | Bode et al. | 475/211 |
| 7,012,341 B2 | 3/2006 | Matsubara | |
| 7,075,192 B2 | 7/2006 | Bywaters et al. | |
| 7,223,137 B1 | 5/2007 | Sosnowski | |
| 7,323,792 B2 * | 1/2008 | Sohn | 290/55 |
| 7,326,106 B1 * | 2/2008 | Rogers et al. | 451/350 |
| 7,550,863 B2 | 6/2009 | Versteegh | |
| 7,563,156 B2 * | 7/2009 | Anderson | 451/353 |
| 7,605,490 B2 | 10/2009 | Srybnik et al. | |
| 7,675,211 B2 | 3/2010 | Dimascio et al. | |
| 7,809,477 B2 * | 10/2010 | Nitzpon et al. | 700/299 |
| 7,843,080 B2 | 11/2010 | Jansen | |
| 7,851,937 B2 | 12/2010 | Poon | |
| 7,944,074 B2 | 5/2011 | Longtin et al. | |
| 7,969,037 B2 | 6/2011 | Segovia et al. | |
| 8,033,794 B2 | 10/2011 | Lee | |
| 8,142,155 B2 | 3/2012 | Numajiri et al. | |
| 8,242,618 B2 | 8/2012 | Numajiri | |
| 2006/0055173 A1 * | 3/2006 | Gianfranco | 290/1 B |
| 2006/0135305 A1 | 6/2006 | Erez et al. | |
| 2006/0138781 A1 | 6/2006 | Miyake et al. | |
| 2006/0172834 A1 | 8/2006 | Laubender | |
| 2006/0177311 A1 * | 8/2006 | Hsu | 416/132 B |
| 2007/0015617 A1 | 1/2007 | Bertolotti et al. | |
| 2008/0284171 A1 * | 11/2008 | Cory | 290/44 |
| 2009/0134623 A1 | 5/2009 | Krouse | |
| 2009/0224552 A1 * | 9/2009 | Sulentic | 290/55 |
| 2012/0152644 A1 | 6/2012 | Kydd | |
| 2012/0292907 A1 | 11/2012 | Krouse | |
| 2013/0029796 A1 | 1/2013 | Tjensvoll | |

FOREIGN PATENT DOCUMENTS

| | | |
|---|---|---|
| FR | 1038146 | 9/1953 |
| JP | 60-51342 | 4/1985 |
| JP | 2003343403 A | 12/2003 |
| JP | 2005023893 A | 1/2005 |
| NO | 20090433 A | 7/2010 |
| NO | 20100194 A | 8/2011 |
| WO | WO-2006/117607 A1 | 11/2006 |
| WO | WO-2007/108075 A1 | 9/2007 |
| WO | WO-2008/028335 A1 | 3/2008 |
| WO | WO-2008/104060 A1 | 9/2008 |
| WO | WO-2008/153295 A1 | 12/2008 |
| WO | WO-2009/028927 A1 | 3/2009 |
| WO | WO-2009/062232 A1 | 5/2009 |
| WO | WO-2009/142573 A1 | 11/2009 |
| WO | WO-2010/004314 A2 | 1/2010 |
| WO | WO-2010/086362 A2 | 8/2010 |

* cited by examiner

DRIVE DEVICE FOR A WIND TURBINE

The present invention relates to a drive device for a wind turbine according to the preamble of the following claim 1.

In most of today's wind turbines the drive unit is placed in a nacelle, which also carries the wind turbine rotor. The nacelle is necessarily arranged on top of a high mast and rotates so that the rotor is always facing the wind.

Such placement of the drive unit results in a great weight at the top of the mast and that access for maintenance is a challenge. Yet it is this position of the drive unit and the generators that is used extensively as the alternative is that the rotational torque must be transmitted via a shaft through the mast, something that leads to losses and requires that the mast can absorb the reaction torque from the rotating shaft.

There is therefore an urgent need to simplify the drive unit and make it lighter. There is also a need to make access for maintenance easier. These are the main aims of the present invention, and these are achieved by the features that appear in the characterising part of claim 1.

To use a belt to transmit the rotation from the rotor to a generator is known from, among others, WO 2008/028335 and JP 2005023893. However, the present invention aims to utilise the characteristics of the belt operation, or possibly the chain operation, better so that a more compact drive device can be achieved with additional operational benefits.

Some of the benefits that can be achieved by the invention in relation to the belt operation, according to the known solutions are:

One gets a doubling of the utilisation of the capacity of the belts with respect to the known belt operation. This relates, in particular, to large (and therefore costly) belts and associated large belt wheels.

The structure becomes more compact.

The torque over the drive shaft is balanced.

The generation of power can be divided onto two generators that can be open to a more reasonable generator control system.

The time before one needs to replace belts can be made longer because one can drive the torque on a single generator when there is little wind.

In comparison to traditional drive systems with cogged wheel transfer, or direct operation, one can achieve the following benefits:

Reduction of shock loads (large momentum changes, vibration, etc. are dampened).

Makes complex lubrication and cooling systems unnecessary.

The system will be less prone to corrosion and have lower maintenance needs. This is particularly relevant for offshore wind turbines. The belt wheels can, for example, be given a zinc coating to reduce corrosion, something that is not possible with cogged wheel transmissions.

A weight saving is achieved by integrating the drive shaft in the belt wheel and also by taking up the torque over a large radius instead of a small radius inside a gearbox.

The number of parts that must be manufactured in the production of the drive system is significantly reduced.

A large part of the maintenance can be done without the use of a large crane. The belts are most susceptible to wear, but even the big belts do not weigh more than 70-100 kg. The belt wheel will not be subjected to wear as the belt is soft.

Scaling up to, for example, 5, 7 and 10 MW, will be possible without the mass of the drive system increasing exponentially. The mass of a 5 MW turbine with gearbox or direct drive will quickly become very heavy.

The power from the rotor can be distributed to several standard generators, something which results in increased flexibility.

A larger exchange can be brought about in one step than with cogged wheel transmission. This is because a large exchange in cogged wheel transmissions leads to high pressure forces on the cogs, something which results in much wear. With a belt operation, there will be a softer transmission and some slip may be acceptable at abrupt torque changes.

A belt drive system also has advantages compared with direct operation. With direct operation a relatively low rotational speed is transmitted to the generator. This means that the generator must be large and heavy. At higher rotational speeds one can use smaller and lighter generators.

The invention shall now be explained in more detail with reference to the accompanying drawings, where:

Figure 1:
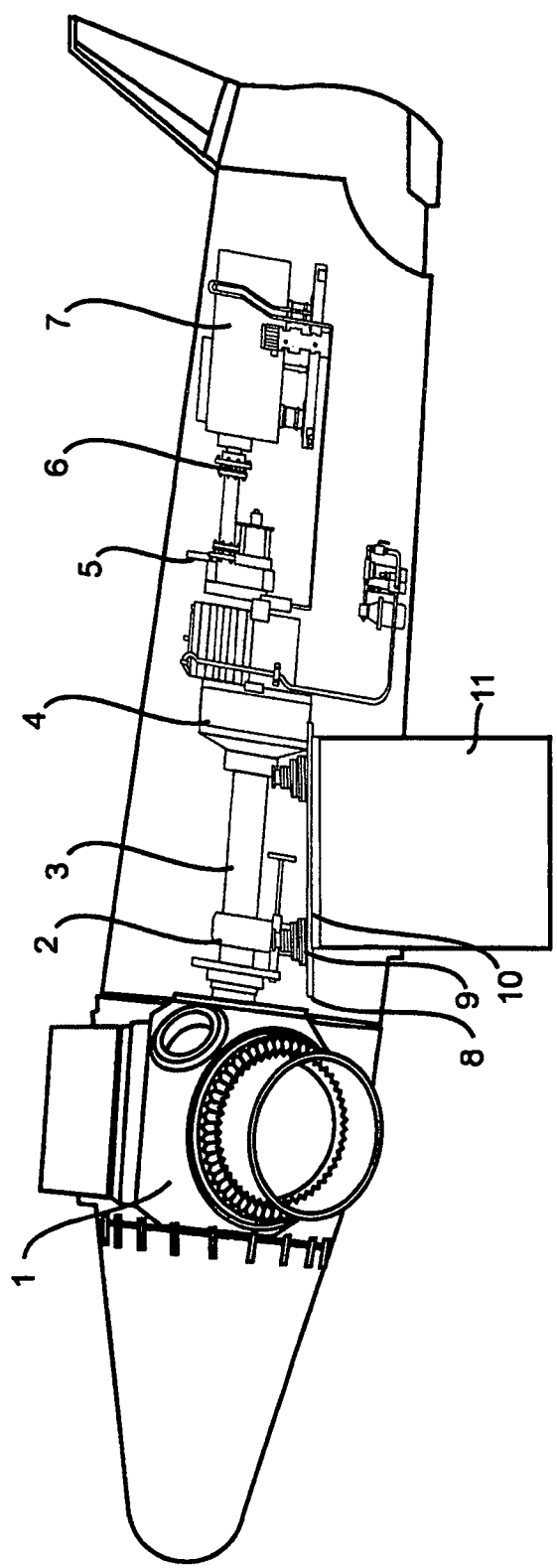
FIG. 1 shows a known nacelle for a wind turbine with a rotor hub, a drive unit and a generator.

Firstly, the known nacelle according to FIG. 1 shall be briefly explained. It comprises a rotor hub 1 to which the wind turbine blades (not shown) are attached. The hub 1 is mounted in a main bearing 2 and is connected to a main shaft 3. The main shaft is connected to a main gear 4. The gear 4 is fitted with a brake 5. The gear is connected to a generator 7 via a connection 6. The nacelle is also fitted with a swivel bearing 8, swivel gear 9 and swivel ring 10 for rotation of the nacelle in relation to a tower 11, on which the nacelle is placed.

The present invention aims to replace the following components in the known nacelle above: the main shaft 3, the main gear 4, the brake 5 and the connection 6.

Figure 2:
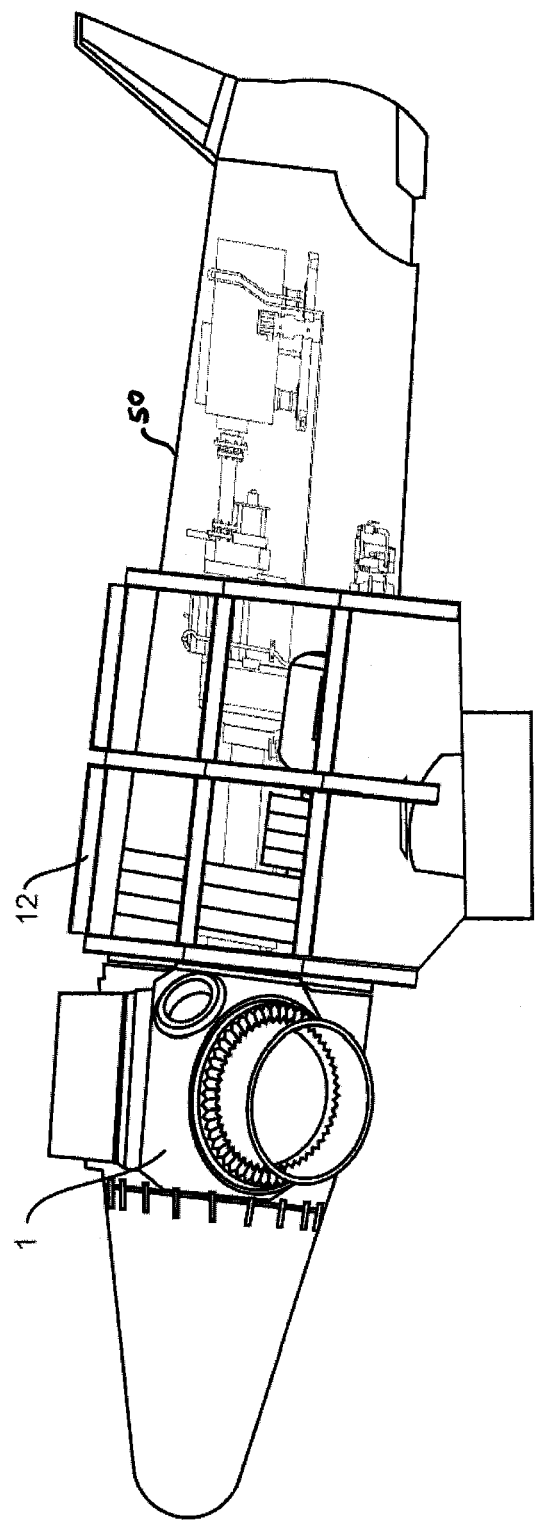
FIG. 2 shows a nacelle similar to that shown in FIG. 1, but with a drive device according to the invention.

FIG. 2 shows the nacelle in FIG. 1 with the drive device according to the invention placed at an intended location and with the known nacelle as a background.

Figure 3:
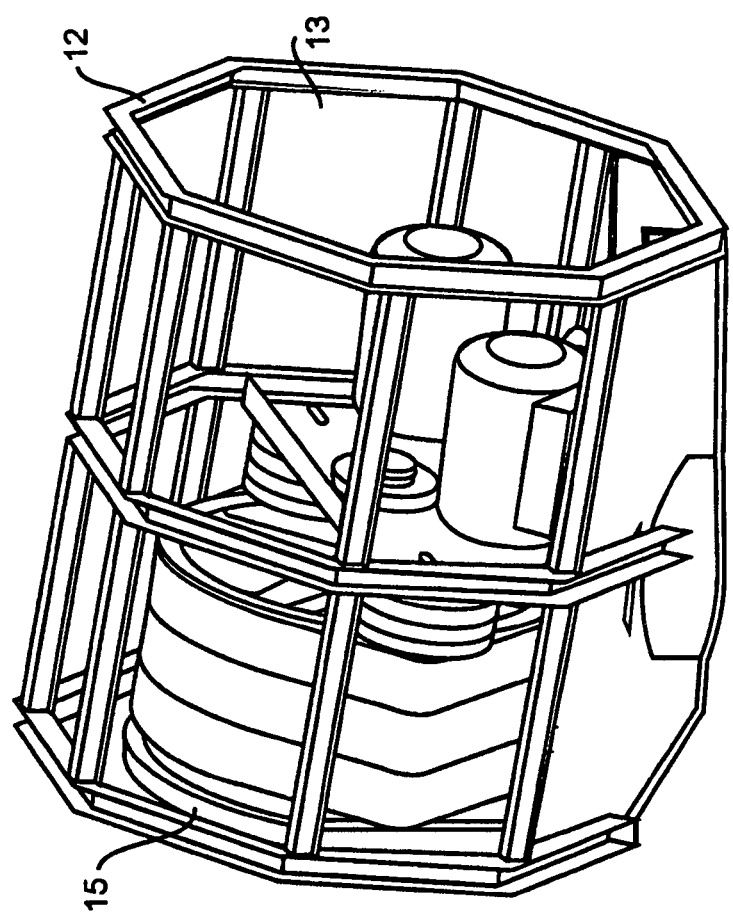
FIG. 3 shows the drive device according to the invention in perspective.
Figure 4:
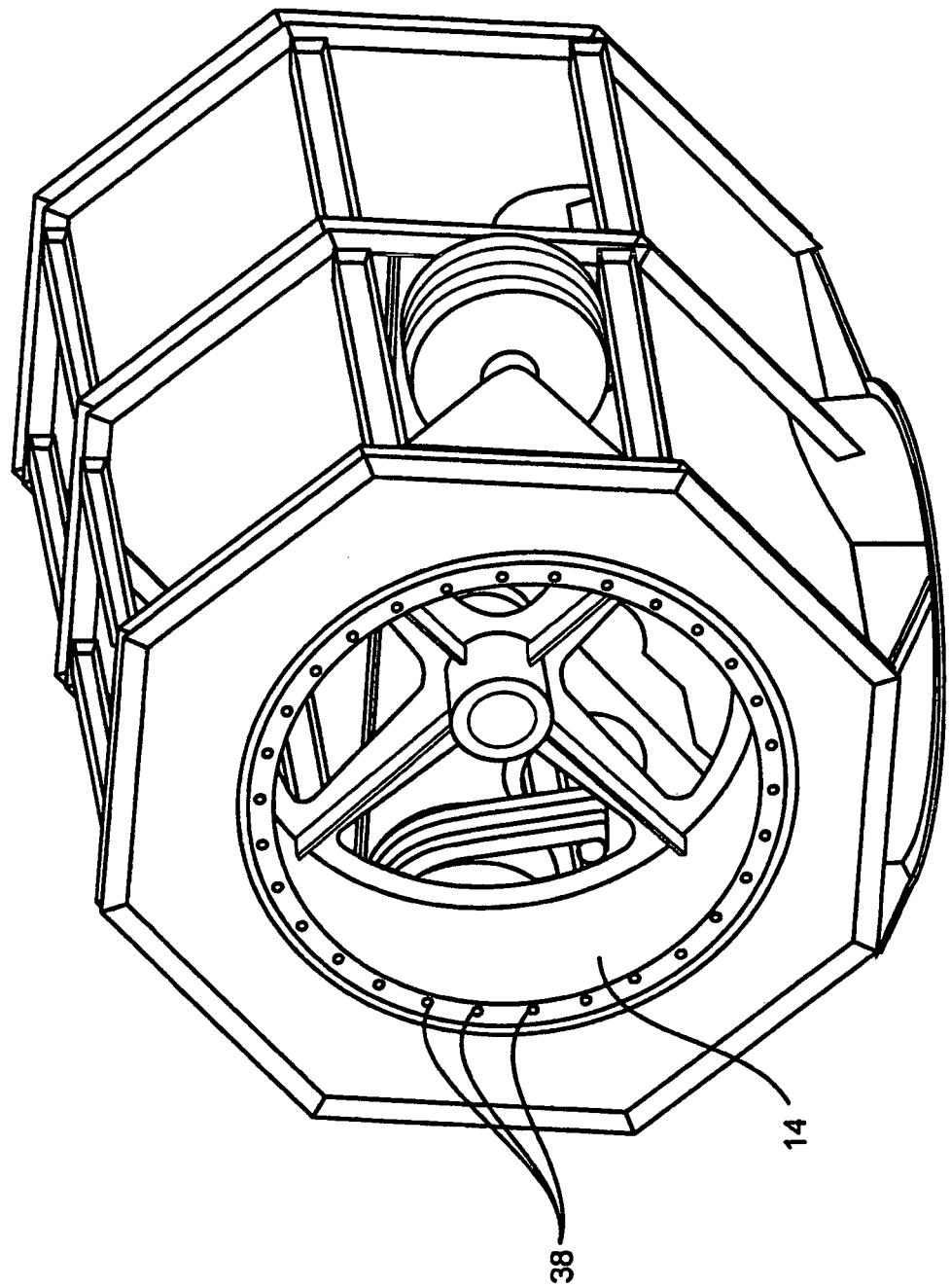
FIG. 4 shows the drive device according to the invention in perspective from the opposite side and FIG. 5 shows the drive device according to the invention in a split drawing.
Figure 5:
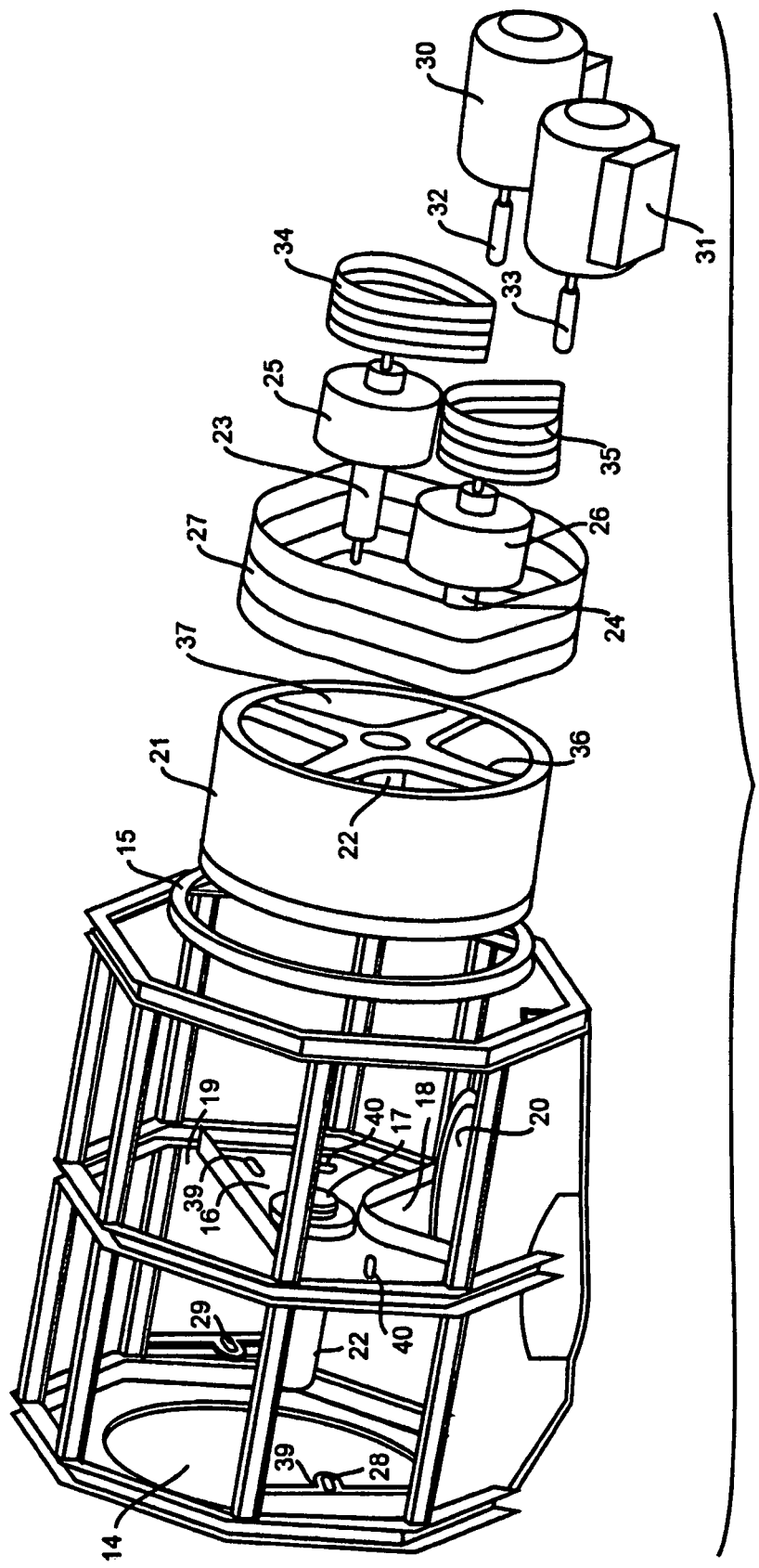

However, before FIG. 2 is explained, the drive device according to the invention shall be explained with reference to the FIGS. 3-5, which show the drive device according to the invention separate from the nacelle 50.

The drive device is mounted in a frame 12, which has a first opening 13 at the one end that faces away from the hub 1 and a second opening 14 at its other end facing towards the hub 1. The opening 14 is circular and is set up to receive a rotation bearing 15. The frame also includes a load-carrying wall 16 for a main shaft bearing 17. The load-carrying wall 16 is equipped with openings 18 and 19. The frame 12 is designed at the bottom to take up a swivel bearing for rotation of the nacelle in relation to the tower. The frame also has an opening 20 in this area.

A large belt disc wheel 21 is mounted between the swivel bearing 15 and main shaft bearing 17 with the help of a main shaft 22. Two secondary shafts 23 and 24 are mounted in parallel with the large belt disc 21 and the main shaft 22. Each of these is fitted with a small belt disc 25, 26 at the ends facing away from the hub 1. A set of belts 27 extends around the large belt disc 21 and the secondary shafts 23, 24 to transmit the rotation torque from the large belt disc 21 to the secondary shafts 23, 24. The secondary shafts 23, 24 are mounted between brackets 28, 29 at the side of the opening 14 and the load-bearing wall 16. Two generators 30, 31 are attached to the frame 12 and have generator shafts 32, 33 that extend through the load-bearing wall 16. These generator shafts 32, 33 are in rotational connection with each of the small belt discs 25, 26 via sets of belts 34, 35.

The large belt disc 21 is provided with spokes 36 so that four openings 37 are formed through the belt disc 21 itself.

The above mentioned results in a compact unit that can form a load-bearing part of the nacelle 50. FIG. 2 shows how this unit will be placed in the nacelle 50. The hub will be connected directly to the large belt disc 21 by means of a number of bolts that are screwed into the bolt holes 38 in the belt disc 21.

Thus the rotation of the hub will lead to a rotation of the large belt disc 21. This will in turn be transmitted to the secondary shafts 23, 24 via the belts 27 and on to the generators 30, 31 via the small belt discs 25, 26 and the belts 34, 35. Since the large belt disc 21 has a significantly larger diameter than the secondary shafts 23, 24, even a small rotational speed of the hub will cause a large rotational speed of the secondary shafts 23, 24. A very large exchange in one step is thereby achieved.

The parallel and diametrically opposite secondary shafts 23, 24 provide a good balance the large belt disc 21. The tightening of the belt can be adjusted by moving the secondary shafts sideways, as is suggested by the oblong holes 39 in the brackets 28, 29 and the load-bearing wall 16. The tightening of the belts 34, 35 can be carried out in a similar way, by displacing the generators 30, 31 sideways, as is indicated by the oblong holes 40 in the load-bearing wall 16.

If the wind is weaker than that required to provide half the power production, one of the generators can be disconnected. The possibility to disconnect half of the generator power means that one can achieve a wider regulating range for the wind turbine where there is little wind, than with the help of a single generator and conventional double-fed generator control.

Figure 6:
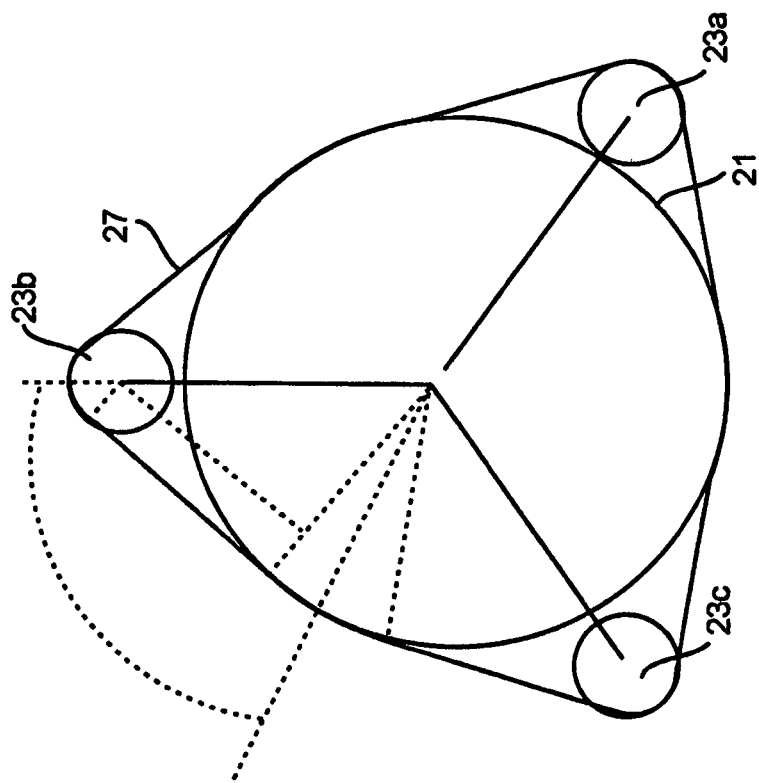
FIG. 6 shows a principle diagram of a drive device with three secondary shafts.

Although two secondary shafts and two generators are described in the above, there is nothing in the way of using several secondary shafts and generators. A principle diagram of a system with three secondary shafts 23a, 23b, 23c, which by way of the one set of belts 27 is in rotational connection with a large belt disc 21, is shown in FIG. 6. Instead of belts 27, 34, 35, one or more chains that engage with the cogs of the large disc and the secondary shaft can also be used.

Figure 7:
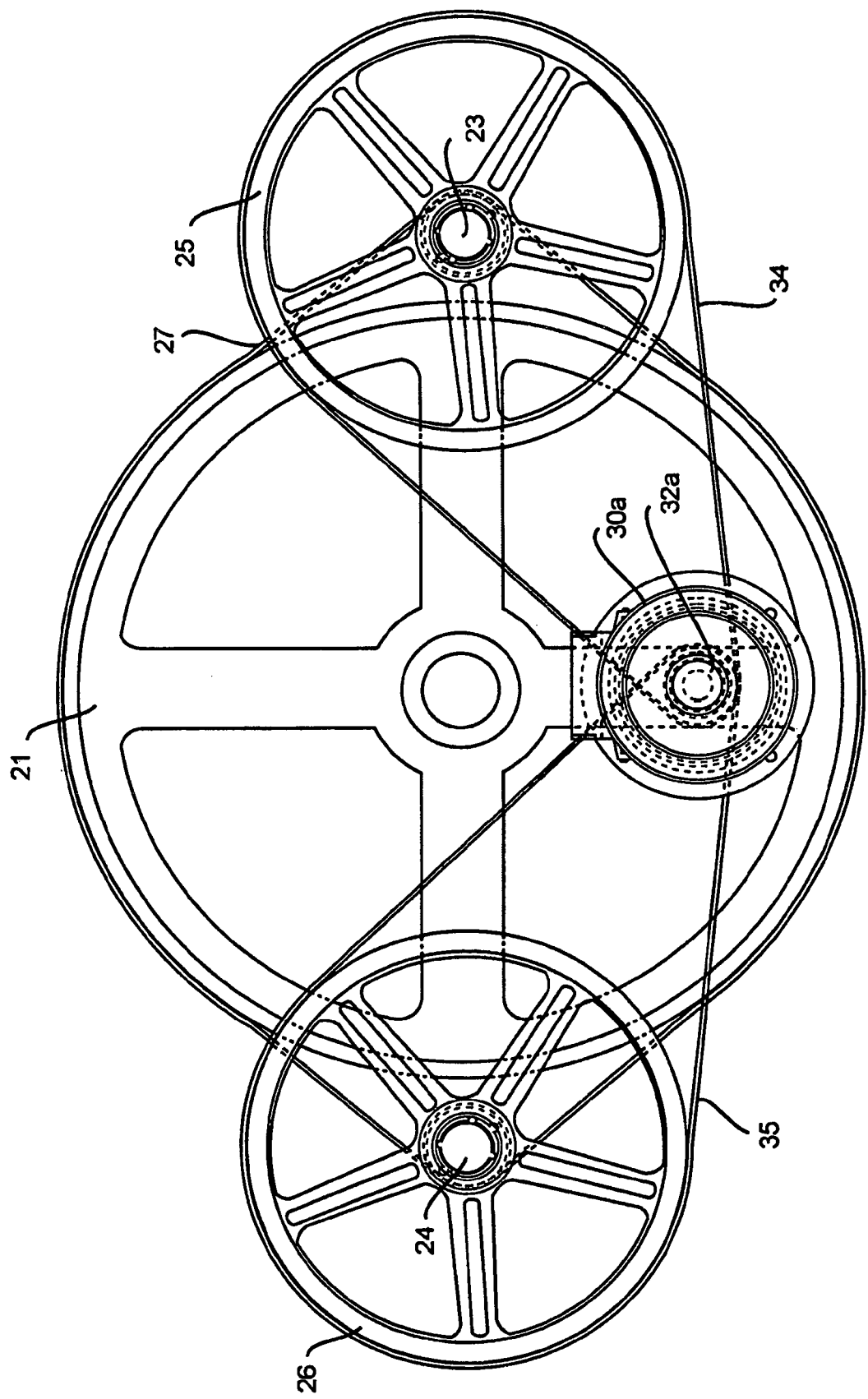
FIG. 7 shows an embodiment with a common generator for two secondary shafts.

Instead of each of the secondary shafts being in connection with their own generator, these can be rotationally connected with a common generator. An example of this is shown in FIG. 7, where the small belt discs 25, 26 are connected via a belt disc set 34, 35 to a common generator shaft 32a that goes into a common generator 30a. Today, this is the most relevant embodiment.

The way the frame 12 is designed and the way the drive unit is positioned in the frame, offer good access for inspection and maintenance. Personnel can come up in the frame 12 via the opening 20, which is in connection with an opening at the top of the tower. From here, the personnel can get to the back of the nacelle via the opening 13 and to the front via the opening 18 or 19. Moreover, it is possible to crawl through the large belt disc 21 itself via one of the openings 37 and from here into the hub.

The drive device according to the invention will also be equipped with a brake which will ensure that nothing rotates while there are people in the nacelle. This brake will most appropriately be arranged at the two small belt discs or on the generators and be active until the maintenance personnel have manually locked the large belt disc and the hub.

The invention claimed is:

1. A drive device for a wind turbine comprising:
   a large belt disc arranged on a main shaft and at least one first belt to transmit rotation from the large belt disc to a single electrical generator, the large belt disc being in in rotational connection with at least two secondary shafts which are arranged in parallel with, and substantially coplanar to, the main shaft and each other;
   wherein the at least two secondary shafts are in turn rotationally connected to the single electrical generator;
   wherein the rotational connection between the large belt disc and the at least two secondary shafts is via the at least one first belt; and
   wherein the at least one first belt extends continuously around the large belt disc and the at least two secondary shafts.

2. The drive device according to claim 1, wherein the at least two secondary shafts are three secondary shafts.

3. The drive device according to claim 2, wherein the secondary shafts are arranged around the large belt disc at a same angular distance in relation to each other.

4. The drive device according to claim 1, wherein the large belt disc and the main shaft are integrated.

5. The drive device according to claim 1, wherein the large belt disc has large through-going openings in parallel with the main shaft.

6. The drive device according to claim 1, wherein the drive device is arranged in a nacelle frame which provides mounting for the large belt disc, the main shaft, the at least two secondary shafts, and the single electrical generator.

7. The drive device according to claim 6, wherein the at least two secondary shafts are mounted so that they can be displaced sideways in the frame in relation to the main shaft and the large belt disc so that tightening of the at least one first belt can be adjusted by moving the at least two secondary shafts.

8. The drive device according to claim 6 wherein the frame comprises openings which provide access for maintenance when the drive device is arranged in a nacelle on a wind turbine as the frame has an opening towards a tower in which the nacelle is placed and that there are openings which give access through both ends of the frame, forwards via openings in the disc and the frame and backwards via openings in the frame.

9. The drive device according to claim 6, wherein the frame comprises a load-bearing wall that provides mounting for an end of the main shaft and the at least two secondary shafts.

10. The drive device according to claim 1, wherein the rotational connection between the at least two secondary shafts and the single electrical generator is via at least a second belt.

11. A drive device for a wind turbine comprising:
    a large belt disc arranged on a main shaft and at least one first belt to transmit rotation from the large belt disc to at least one electrical generator, the large belt disc being in in rotational connection with at least two secondary shafts which at least two secondary shafts are arranged in parallel with, and substantially coplanar to, the main shaft and each other;
    wherein the at least two secondary shafts are in turn rotationally connected to the at least one electrical generator;

wherein the rotational connection between the large belt disc and the at least two secondary shafts is via the at least one first belt;

wherein the rotational connection between the at least two secondary shafts and the at least one electrical generator is via at least one second belt; and wherein the at least one first belt extends continuously around the large belt disc and the at least two secondary shafts.

12. The drive device according to claim 11, wherein the at least two secondary shafts are three secondary shafts.

13. The drive device according to claim 12, wherein the secondary shafts are arranged around the large belt disc at a same angular distance in relation to each other.

14. The drive device according to claim 11, wherein the large belt disc and the main shaft are integrated.

15. The drive device according to claim 11, wherein the drive device is arranged in a nacelle frame which provides mounting for the large belt disc, the main shaft, the at least two secondary shafts, and the at least one electrical generator.

16. The drive device according to claim 15, wherein the at least two secondary shafts are mounted so that they can be displaced sideways in the frame in relation to the main shaft and the large belt disc so that tightening of the at least one first belt can be adjusted by moving the at least two secondary shafts.

17. The drive device according to claim 15, wherein the frame comprises a load-bearing wall that provides mounting for an end of the main shaft and the at least two secondary shafts.

18. The drive device of claim 7, wherein each secondary shaft of the at least two secondary shafts is received into an oblong-shaped hole thereby facilitating lateral movement of the at least two secondary shafts relative to the frame.

19. The drive device of claim 11, wherein the at least one second belt is tensioned via displacement of the at least one electrical generator.

20. A drive device for a wind turbine comprising:

a large belt disc arranged on a main shaft and at least one first belt to transmit rotation from the large belt disc to a single electrical generator, the large belt disc being in in rotational connection with at least two secondary shafts which are arranged in parallel with the main shaft;

wherein the at least two secondary shafts are in turn rotationally connected to the single electrical generator;

wherein the single electrical generator is located equidistant between the at least two secondary shafts;

wherein the rotational connection between the large belt disc and the at least two secondary shafts is via the at least one first belt; and wherein the at least one first belt extends continuously around the large belt disc and the at least two secondary shafts.

* * * * *